United States Patent
Wasa et al.

(10) Patent No.: US 7,561,366 B2
(45) Date of Patent: Jul. 14, 2009

(54) DISK DRIVE AND CALIBRATION METHOD FOR THE SAME

(75) Inventors: Nobuhiko Wasa, Kanagawa (JP); Sayaka Nojiri, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 96 days.

(21) Appl. No.: 11/788,481

(22) Filed: Apr. 20, 2007

(65) Prior Publication Data

US 2007/0247740 A1 Oct. 25, 2007

(30) Foreign Application Priority Data

Apr. 20, 2006 (JP) .............................. 2006-116479

(51) Int. Cl.
G11B 21/02 (2006.01)
G11B 5/596 (2006.01)

(52) U.S. Cl. ........................................ 360/75; 360/78.06

(58) Field of Classification Search ........................ None
See application file for complete search history.

(56) References Cited

U.S. PATENT DOCUMENTS 6,229,663 B1 5/2001 Yoneda et al.
6,563,660 B1 5/2003 Hirano et al.
7,042,673 B2 * 5/2006 Jeong ........................... 360/75
2004/0047064 A1 * 3/2004 Kusumoto et al. ............ 360/75

FOREIGN PATENT DOCUMENTS

JP 11-025626 11/1999

* cited by examiner

*Primary Examiner*—Andrew L Sniezek
(74) *Attorney, Agent, or Firm*—Townsend and Townsend and Crew LLP; John Henkhaus

(57) ABSTRACT

In an embodiment of the present invention, a Hard Disk Controller Microprocessing Unit (HDC/MPU) supplies, prior to the unloading process, different currents to a VCM, with an actuator positioned in place and kept at a standstill. The HDC/MPU determines a correction factor from VCM speeds vmeas, each of which is detected at each of VCM currents Ivcm. If the determined correction factor falls outside a reference limit, the HDC/MPU determines a new circuit parameter for a VCM speed detection circuit. Further, the HDC/MPU calculates a new correction factor appropriate to the circuit parameter. The HDC/MPU and the VCM speed detection circuit control the speed of the VCM in the unloading process using the new circuit parameter and the new correction factor.

13 Claims, 8 Drawing Sheets

DISK DRIVE AND CALIBRATION METHOD FOR THE SAME

CROSS-REFERENCE TO RELATED APPLICATION

The instant nonprovisional patent application claims priority to Japanese Patent Application 2006-116479, filed Apr. 20, 2006 and incorporated by reference in its entirety herein for all purposes.

BACKGROUND OF THE INVENTION

Devices using various types of media such as optical discs, magnetic optical discs, and flexible magnetic disk are known in the art as data storage devices. Among them, hard disk drives (hereinafter referred to as HDDs) have become popular as storage devices for computers to such an extent that they are one of the storage devices indispensable for today's computer systems. Further, not limited to the computers as described above, HDDs are becoming more and more widely used in various applications. For example, HDDs are used for video recording/reproducing devices, car navigation systems, cellular phones, and removable memories for use in digital cameras.

A magnetic disk for HDD has a plurality of data tracks formed in a concentric manner. Each data track holds a plurality of pieces of servo data containing address information and a plurality of data sectors including user data. A plurality of data sectors are recorded between each piece of servo data and the next. An actuator is driven to rotate by a voice coil motor (VCM). A head element unit of a head slider supported by the actuator accesses a desired data sector in accordance with address information in servo data. This allows data to be written to and read from the data sector.

When the magnetic disk is not rotating, the actuator and the slider head are retracted to their parking positions. Load/unload and CSS (Contact Start Stop) systems are known methods to retract the head slider. During the travel between the parking position and a position over the magnetic disk, the HDD controls the VCM speed to control the rotation of the actuator. More specifically, a VCM speed detection circuit detects the VCM speed based on a counter electromotive voltage of the VCM. A controller supplies the VCM with a VCM current so as to bring the detected VCM speed equal to a target speed. detects a first counter electromotive voltage generated by a first current caused to flow through the voice coil motor, with the actuator positioned in place. Further, the detection circuit detects a second counter electromotive voltage generated by a second current, different from the first current, caused to flow through the voice coil motor, with the actuator positioned in place. The controller controls the drive of the actuator using the value obtained by correcting the output of the detection circuit. Further, the controller determines a correction factor for the output of the detection circuit using the first and second counter electromotive voltages. If the correction factor falls outside a reference limit, the controller determines a new circuit parameter for the detection circuit and a new correction factor appropriate to the new circuit parameter. The controller determines the new circuit parameter of the detection circuit and the new correction factor appropriate to the new circuit parameter to prevent unstable VCM speed control that may be caused by the correction factor outside the reference limits.

Embodiments of the present invention are particularly useful when the controller controls the actuator by correcting the output of the detection circuit, into which the new circuit parameter has been set, using the new correction factor, so as to move the head to its parking position. In one aspect, the controller determines the new circuit parameter using the correction factor determined based on the first and second counter electromotive voltages. This ensures more accurate determination of the circuit parameter so as to bring the correction factor closer to a desired value.

In one embodiment, the detection circuit, into which the new circuit parameter has been set, detects a third counter electromotive voltage generated by a third current caused to flow through the voice coil motor, with the actuator positioned in place. The detection circuit may also detect a fourth counter electromotive voltage generated by a fourth current, different from the third current, caused to flow through the voice coil motor, with the actuator positioned in place. In one aspect, the controller determines the new correction factor based on the third and fourth counter electromotive voltages. Measurement of the third and fourth counter electromotive voltages ensures higher accuracy in determining the new correction factor. Here, the value of the third current may be the same as or different from that of the first current. Similarly, the value of the fourth current may be the same as or different from that of the second current.

According to an embodiment of the present invention, the detection circuit detects the first counter electromotive voltage when the actuator follows a first track on the disk and detects the second counter electromotive voltage when the actuator follows a second track different from the first track. In one embodiment, the detection circuit detects the third counter electromotive voltage when the actuator follows a third track on the disk and detects the fourth counter electromotive voltage when the actuator follows a fourth track different from the third track. In one aspect, this makes it possible to prevent generation of sounds. It should be noted that the third track may be the same as or different from the first track. Similarly, the fourth track may be the same as or different from the second track.

In one embodiment, the controller determines, based on the first and second currents and the first and second counter electromotive voltages, a slope of change of the counter electromotive voltage with respect to the current, and use the slope as the correction factor. The controller may determine the new circuit parameter so as to reduce the slope. In one aspect, this makes it possible to prevent unstable VCM speed control that may be caused by a large slope.

In an embodiment, a disk drive of the present invention is provided with a setting circuit adapted to automatically set the circuit parameter. In one aspect, the detection circuit detects the first and second counter electromotive voltages using the circuit parameter set by the setting circuit. The controller may set the new circuit parameter into the detection circuit. In one aspect, this ensures fast calibration with the setting circuit and minimizes unstable operation with the new circuit parameter.

Another embodiment of the present invention is a calibration method to control the speed of the voice coil motor in a disk drive provided with an actuator adapted to support a head and a voice coil motor adapted to drive the actuator. In one embodiment, this method supplies the voice coil motor with a first current to position the actuator in place and detects a first counter electromotive voltage of the voice coil with the actuator positioned in place. The method further supplies the voice coil motor with a second current different from the first current to position the actuator in place and detects a second counter electromotive voltage of the voice coil with the actuator positioned in place. Next, the method determines, based on the first and second counter electromotive voltages, a correction factor for a counter electromotive voltage detected during the speed control. Further, the method sets a new circuit parameter into a detection circuit adapted to detect the counter electromotive voltage of the voice coil motor if the correction factor falls outside a reference limit. The method still further determines a new correction factor appropriate to the new circuit parameter.

For a more complete understanding of the present invention, reference is made to the following detailed description taken in conjunction with the accompanying drawings.

DETAILED DESCRIPTION OF THE INVENTION

Figure 1:
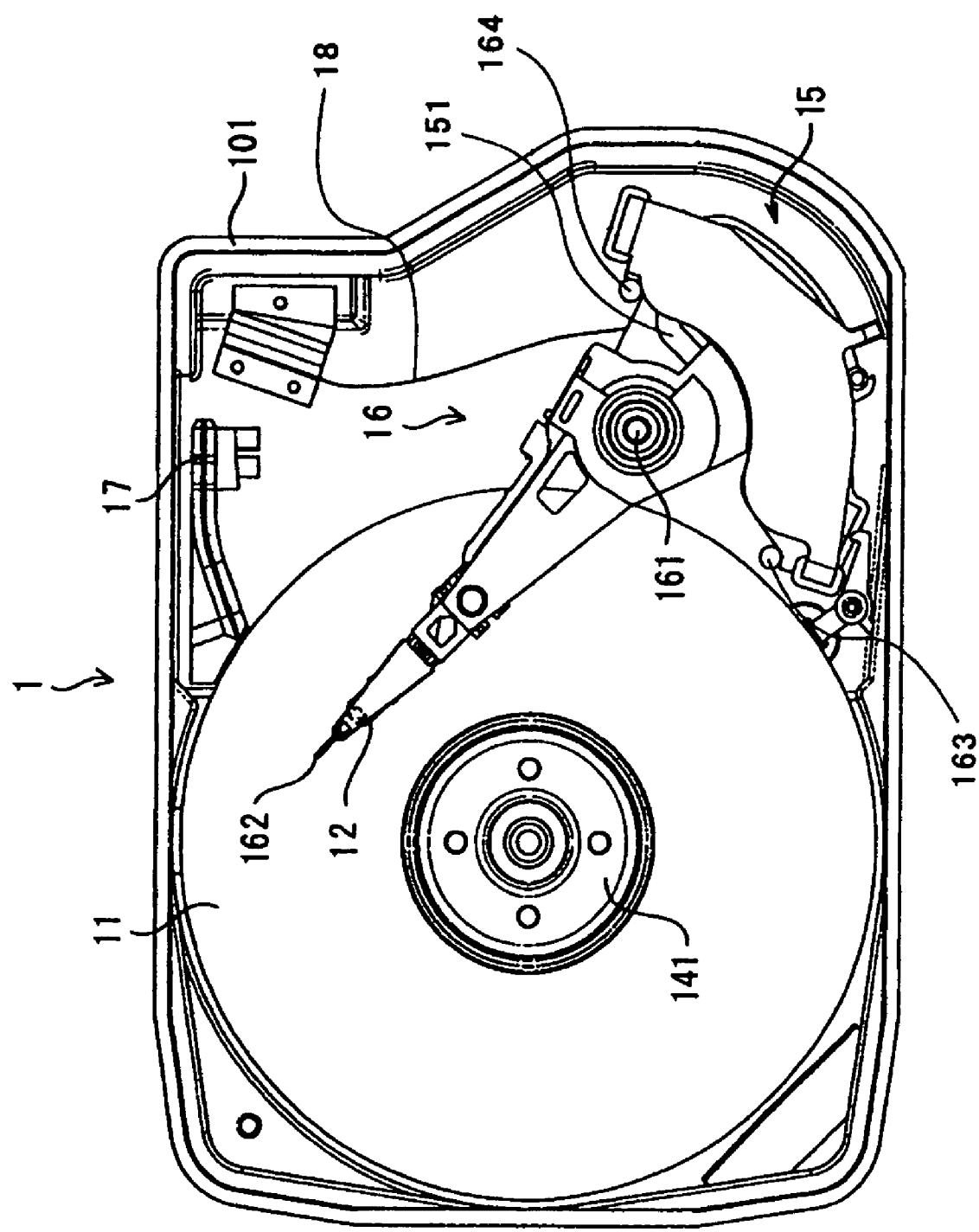
FIG. 1 is a view schematically showing the overall mechanical configuration of an HDD according to an embodiment of the present invention.

Embodiments in accordance with the present invention relate to a disk drive and a calibration method for the same and, more particularly, to calibration for controlling the speed of a voice coil motor.

Embodiment to which the present invention is applicable will be described below. Omissions and simplifications have been made as necessary in the description and drawings for clarity of explanation. It should also be noted that, in the drawings, the same reference numerals are assigned to the same elements, and that the repeated explanation is omitted as necessary for clarity of explanation.

In one aspect, embodiments in accordance with the present invention are characterized by a speed feedback control applied to a VCM that is adapted to drive an actuator. The HDD is provided with a detection circuit adapted to detect the counter electromotive voltage of the VCM, and a controller. The controller corrects the detected counter electromotive voltage and performs feedback control of the VCM speed using the calculation result. The controller calibrates a correction factor prior to starting its VCM speed control. In this calibration, if the correction factor falls outside a reference limit, the controller resets a variable circuit parameter into the detection circuit and calibrates the correction factor again, thus minimizing unstable VCM speed control.

The overall configuration of the HDD will be described first to facilitate the understanding of the characteristics of the present embodiment. FIG. 1 is a schematic configuration of an HDD 1 according to an embodiment of the present embodiment. FIG. 1 illustrates the condition of the HDD 1 when a head slider 12 flies over a magnetic disk 11. In FIG. 1, the magnetic disk 11, which is an example of a data storage disk, is a nonvolatile recording disk that records data as a result of the magnetization of a magnetic layer. A base 101 makes up an enclosure as it is fastened via a gasket (not shown) to a top cover (not shown) that blocks the top opening of the base 101. The enclosure houses components of the HDD 1 in a hermetically sealed manner.

The magnetic disk 11 is fastened to a spindle motor (SPM) (not shown) by a clamp 141. The SPM rotates the magnetic disk 11 at a predetermined angular velocity. The head slider 12 accesses a recording region of the magnetic disk 11. The head slider, which is an example of a head, has a head element unit and a slider to which the head element unit is fastened. The head element unit is provided with a read element adapted to read data from the magnetic disk 11 and/or a write element adapted to write data thereto.

An actuator 16 holds and moves the head slider 12. The actuator 16 is held by a rotary shaft 161 so as to be freely rotatable. The actuator 16 pivots about the rotary shaft 161 along the radius of the magnetic disk 11 by the driving force of a VCM (voice coil motor) 15, which serves as a driving mechanism, so as to move the head slider 12 to a desired position. The VCM 15 is provided with a voice coil 151 that is fastened to the actuator 16. The VCM 15 is made up of the voice coil 151 and two magnets (not shown) that are located so as to sandwich the voice coil 151 in the direction of the pivot shaft.

The HDD 1 of the present embodiment is a load/unload HDD and is provided with a ramp 17 to retract the head slider 12 from the surface of the magnetic disk 11. The ramp 17 is disposed in proximity to the outer edge portion of the magnetic disk 11. The head slider 12 flies over the magnetic disk 11 because the pressure induced by the viscosity of air between an ABS (Air Bearing Surface) of the slider opposed to the magnetic disk 11 and the rotating magnetic disk 11 balances with the force applied in the direction of the magnetic disk 11 by the actuator 16.

However, if the magnetic disk 11 stops rotating, the head slider 12 may touch the surface of the magnetic disk 11, possibly damaging the data region or rendering the magnetic disk unable to rotate due to an adsorption phenomenon. Therefore, when the magnetic disk 11 is at a standstill, or for power saving reasons, the actuator 16 unloads the head slider 12 from the surface of the magnetic disk 11 to the ramp 17.

In the unloading, the actuator 16 supporting the head slider 12 that flies over the magnetic disk 11 rotates toward the ramp 17. As a tab 162 reaches the edge portion of the ramp 17 on the side of the magnetic disk, it runs onto the sliding surface of the ramp 17. The actuator 16 further rotates in the direction away from the magnetic disk 11 (unloading direction), causing the tab 162 to move while sliding on the sliding surface of the ramp 17. The actuator 16 is latched when the tab 162 reaches the stop position on the stop surface of the ramp 17. When inactive, the actuator 16 is kept at a standstill in this manner at this stop position on the ramp 17. In the loading, the actuator 16 operates in reverse to the sequence described above. Loading and unloading are carried out by the VCM 15 speed feedback control. Detailed description in this regard will be made later.

Further, the HDD 1 has outer and inner crash stops 163 and 164 that limit the pivoting range of the actuator 16. The outer crash stop 163 limits the pivoting range of the actuator 16 in the unloading direction, thereby preventing the actuator 16 from rotating outwardly beyond the ramp 17. The inner crash stop 164 limits the pivoting range of the actuator 16 in the loading direction, thereby preventing the actuator 16 from colliding with the clamp 141 during its inward rotation.

Figure 2:
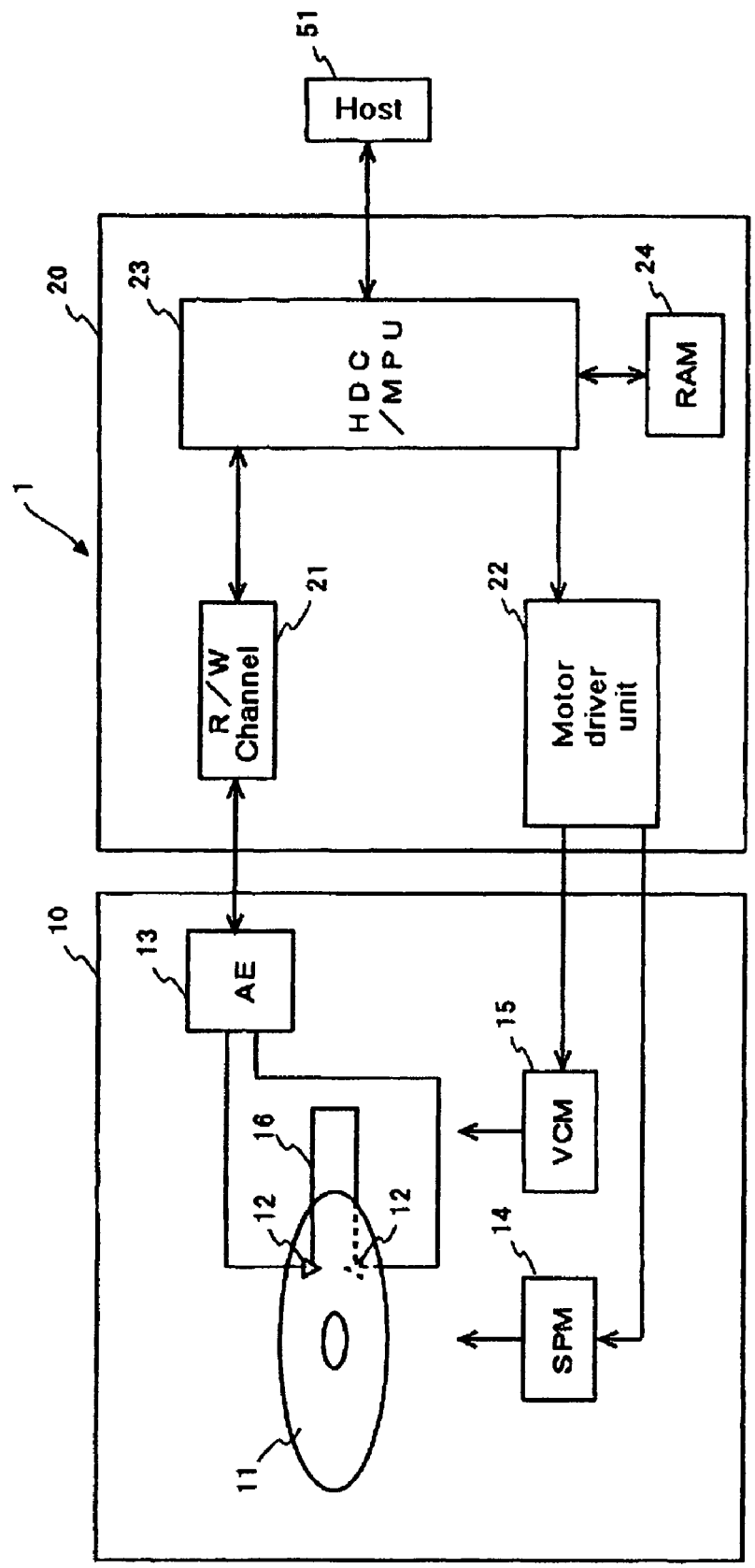
FIG. 2 is a block diagram schematically showing the overall mechanical configuration of a HDD according to an embodiment of the present invention.

The overall configuration of control carried out by the HDD 1 will be described below with reference to FIG. 2. As shown in FIG. 2, the HDD 1 is provided with a circuit board 20 that is fastened to the outside of an enclosure 10. The circuit board 20 includes various ICs, including a read/write channel (RW channel) 21, a motor driver unit 22, a combination of hard disk controller (HDC) and MPU (hereinafter HDC/MPU) 23, a RAM 24 and ROM (not shown). It should be noted that each circuit configuration can be implemented on a single IC or multiple ICs.

The motor driver unit 22 drives an SPM 14 in accordance with control data from the HDC/MPU 23, which is an example of a controller. Further, the motor driver unit 22 detects the counter electromotive voltage and speed of the VCM 15 to control the VCM speed. The magnetic disk 11 in FIG. 2 has a data recording surface on each side, and the head slider 12 is provided for each recording surface. The motor driver unit 22 drives the VCM 15 in accordance with control data (referred to as DACOUT) from the HDC/MPU 23.

It should be noted that it suffices to provide the one or more magnetic disks 11. A recording surface may be formed on one or both sides of the magnetic disk 11. An AE 13 selects one of the plurality of head sliders 12 to access the magnetic disk 11. Further, the AE 13 preamplifies a reproduction signal reproduced by the selected head slider 12 and transmits the signal to the RW channel 21. Still further, the AE 13 transmits a recording signal from the RW channel 21 to the selected head slider 12.

In the read process, the RW channel 21 extracts data from a read signal supplied from the AE 13 to decode the data. The data read includes user and servo data. The decoded read user data is supplied to the HDC/MPU 23. Further, the RW channel 21 carries out the write process in accordance with a control signal from the HDC/MPU 23. Still further, the RW channel 21 code-modulates write data from the HDC/MPU 23, converts the code-modulated write data to a write signal and transmits the signal to the AE 13.

The MPU in the HDC/MPU 23 operates in accordance with microcodes loaded into the RAM 24. As the HDD 1 starts up, not only microcodes that will run on the MPU but also other data required for control and data processing, are loaded into the RAM 24 from the magnetic disk 11 or ROM. The HDC/MPU 23 performs overall control of the HDD 1 as well as handles necessary data processing tasks, including read/write process control, management of command execution sequence, positioning control (servo control) of the head slider 12 using a servo signal, interface control and defect management.

Figure 3:
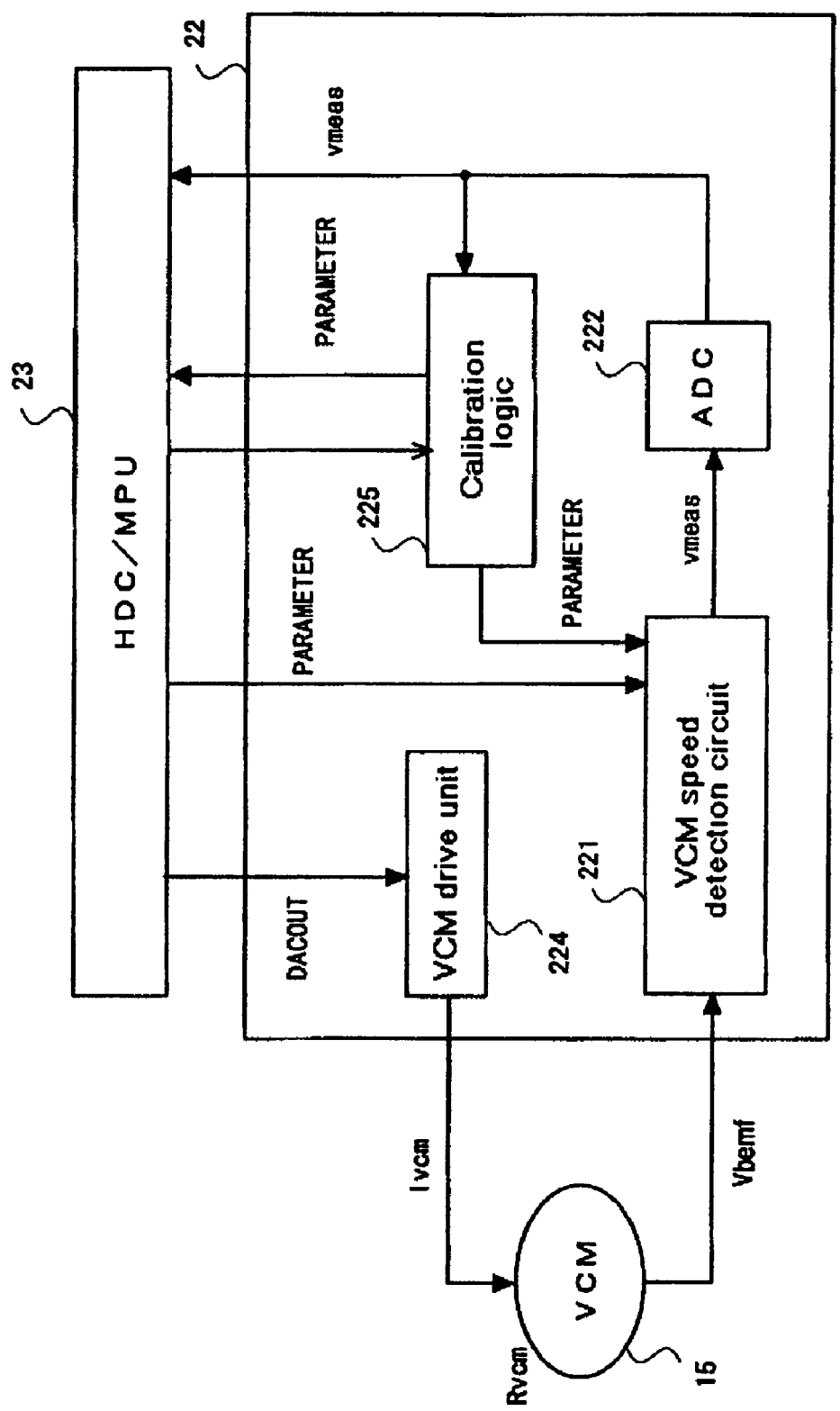
FIG. 3 is a block diagram schematically showing the functional configuration related to VCM speed control according to an embodiment of the present invention.

In the loading/unloading process, the HDC/MPU 23 controls the VCM 15 through speed feedback control. As shown in FIG. 3, the motor driver unit 22 is provided with a VCM speed detection circuit 221 adapted to detect the VCM speed. The VCM speed detection circuit 221 detects the counter electromotive voltage of the VCM 15 and outputs the VCM speed obtained by multiplying the counter electromotive voltage by a predetermined gain. The output from the VCM speed detection circuit 221 is converted to digital data by an AD converter (ADC) 222. Data vmeas representing the detected VCM speed is transmitted to the HDC/MPU 23. It should be noted that data exchange between the motor driver unit 22 and the HDC/MPU 23 can be accomplished by storing data in a register set in the motor driver unit 22.

The HDC/MPU 23 acquires the current VCM speed vmeas from the motor driver unit 22 and determines, based on this value and a target speed, a VCM current so as to bring the VCM speed close to the target speed. The HDC/MPU 23 outputs the data DACOUT representing the determined VCM current to the motor driver unit 22. A VCM drive unit 224 of the motor driver unit 22 supplies a VCM current Ivcm to VCM 15 in accordance with the control data DACOUT from the HDC/MPU 23.

The VCM speed detection circuit 221 detects a counter electromotive voltage Vbemf of the VCM 15 by detecting the VCM current flowing through the VCM 15 and a VCM voltage which is the voltage level of the VCM current. When detecting the counter electromotive voltage Vbemf, the VCM speed detection circuit 221 operates assuming that a VCM resistance Rvcm is known. That is, the VCM speed detection circuit 221 detects the correct counter electromotive voltage Vbemf only when the VCM resistance Rvcm takes on a specific value. If the VCM resistance Rvcm deviates from the specific value, an error will occur in the detected counter electromotive voltage. Since the VfCM resistance Rvcm varies with change in temperature, the counter electromotive voltage Vbemf detected may vary significantly due to temperature variation.

For this reason, the VCM speed detection circuit 221 has a variable circuit parameter (circuit element) PARAMETER to deal with the variation of the VCM resistance Rvcm. A calibration logic 225 carries out the calibration process in response to an instruction from the HDC/MPU 23. At the same time, the calibration logic 225 sets the variable circuit parameter PARAMETER, that is appropriate to the VCM resistance Rvcm, into the VCM speed detection circuit 221.

As the calibration logic 225 changes the circuit parameter PARAMETER of the VCM speed detection circuit 221 in response to variation in the VCM resistance Rvcm, the counter electromotive voltage detected by the VCM speed detection circuit 221 can be brought closer to the correct voltage. However, setting of the circuit parameter PARAMETER alone is unable to sufficiently compensate for a detection error caused by the circuit configuration. Therefore, the HDC/MPU 23 corrects the acquired VCM speed vmeas and determines, based on the corrected VCM speed and the target speed, the final VCM current.

Prior to the loading/unloading process, the HDC/MPU 23 carries out the calibration process to determine a correction factor for the correction process. While detailed description of the calibration process will be made later, this process consists of causing different currents to flow through the VCM 15, which is positioned in place and kept at a standstill, and determining the correction factor from the VCM speed vmeas detected at each of the VCM currents Ivcm.

In one aspect, if the determined correction factor falls outside a reference limit, the HDC/MPU 23 determines the new circuit parameter PARAMETER for the VCM speed detection circuit 221, and further calculates the new correction factor appropriate to the new circuit parameter PARAMETER. The VCM speed detection circuit 221 and the HDC/MPU 23 use the new circuit parameter PARAMETER and the new correction factor to carry out the speed feedback process for the VCM 15 in the unloading process.

Figure 4:
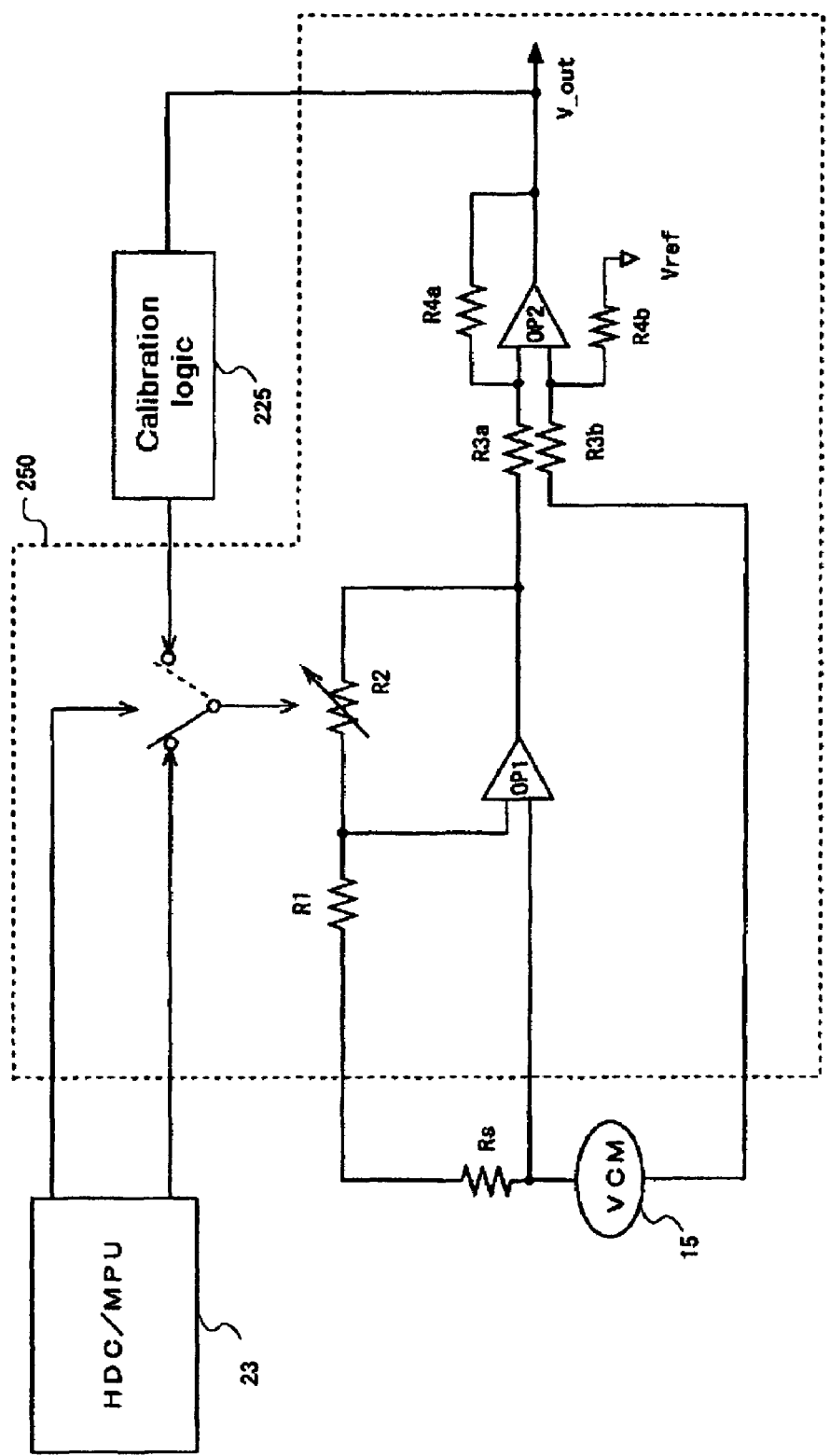
FIG. 4 is a circuit diagram schematically showing the configuration of a counter electromotive voltage detection circuit in a VCM speed detection circuit according to an embodiment of the present invention.

First, a description will be made of the circuit configuration of the VCM speed detection circuit 221. FIG. 4 is a circuit diagram schematically showing the circuit configuration of a counter electromotive voltage detection circuit 250 in the VCM speed detection circuit 221. While description will be given later, the calibration performed by the VCM speed detection circuit 221 involves adjusting the circuit parameter, and more specifically, a variable resistance R2, of the counter electromotive voltage detection circuit 250. The counter electromotive voltage detection circuit 250 includes opamps OP1 and OP2 and balancing resistors R1, R2, R3a, R3b, R4a and R4b. The resistors R3a and R3b have an identical resistance R3, whereas the resistors R4a and R4b have an identical resistance R4. The resistor R2 is a variable resistor whose resistance R2 serves as the aforementioned circuit parameter. In addition to the above resistors, a sensing resistor Rs is also provided that is connected in series with the VCM coil.

The counter electromotive voltage Vbemf of the VCM 15 satisfies the following formula:

$$Vbemf = Vvcm - Rvcm \times Ivcm \quad (1)$$

where Vvcm, Rvcm and Ivcm are the VCM coil voltage (VCM voltage), the VCM coil resistance (VCM resistance), and the current flowing through the VCM (VCM current), respectively. We assume that the VCM current Ivcm is constant and remains unchanged. The counter electromotive voltage detection circuit 250 is capable of detecting Vbemf by directly or indirectly detecting Vvcm and Ivcm.

The opamp OP1 and the resistors Rvcm, Rs, R1 and R2, as a whole, make up a bridge circuit. The resistances R1 and R2 determine the gain of the amplifier in the first stage. When this bridge circuit is in equilibrium, Vbemf is equal to the VCM voltage Vvcm. When this bridge circuit is in equilibrium, the following relationship is satisfied:

$$R2/R1 = Rvcm/Rs \quad (2)$$

The opamp OP2 and the resistors R3a to R4b constitute a differential amplification circuit adapted to produce the output of the opamp OP1 as the counter electromotive voltage (or a predetermined multiple thereof). The resistances R3 and R4 determine the gain of the amplifier in the output stage. An output Vout of the opamp OP2 is given by the following formula:

$$R4/R3 \times (Ivcm \times Rs \times R2/R1 - Vvcm) + Vref \quad (3)$$

The output Vout of the opamp OP2 is equivalent to a predetermined multiple of the counter electromotive voltage of the VCM 15. The speed of the VCM 15 can be obtained by further multiplying the output Vout of the opamp OP2 by a predetermined multiple.

Here, in order for the relationship represented by formula (3) to hold, the bridge circuit must be in equilibrium, that is, the relationship represented by formula (2) must hold. If this relationship does not hold, an error will occur between the output Vout of the opamp OP2 and the counter electromotive voltage Vbemf of the VCM 15. This causes the speed vmeas output (detected) by the VCM speed detection circuit 221 to differ from the actual VCM speed. As the VCM resistance Rvcm changes with change in temperature, the formula (2) will not hold if the temperature changes, assuming that the resistances of the resistors R2 and R1 are constant.

Figure 5:
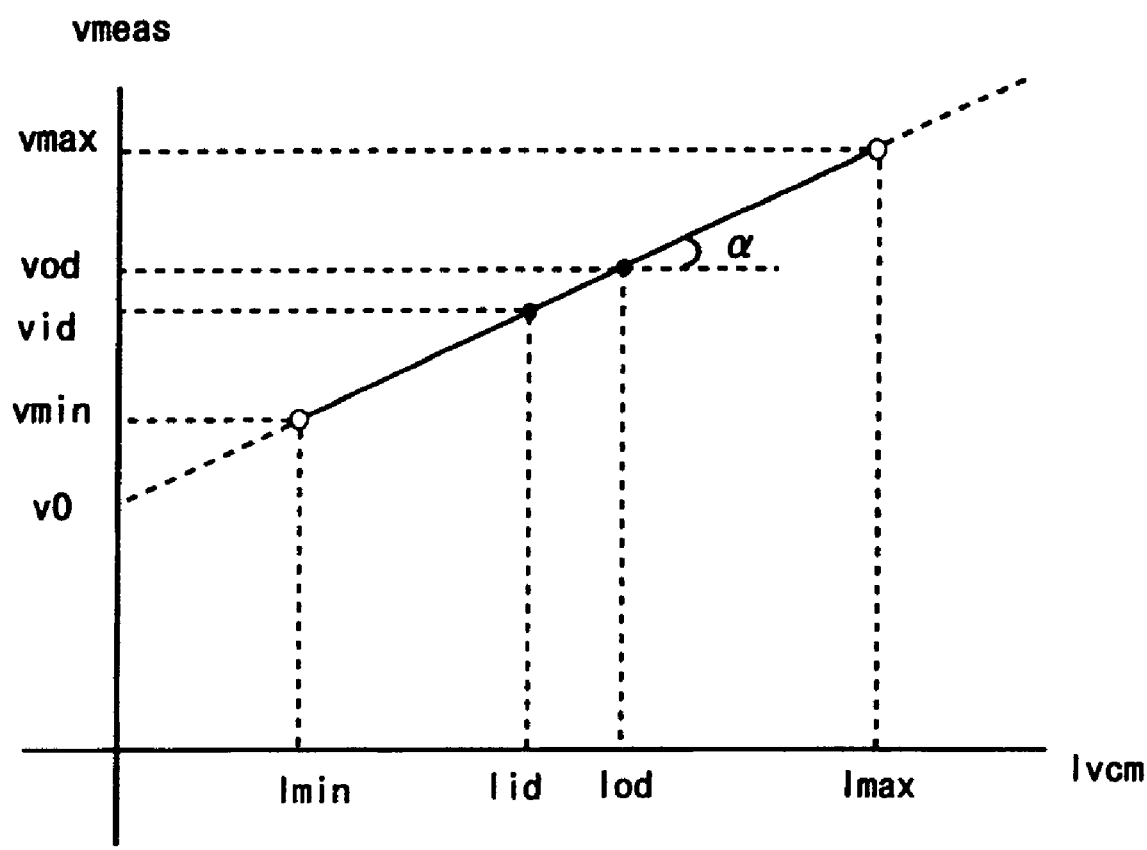
FIG. 5 is a graph schematically showing the relationship between a VCM speed vmeas detected by the VCM speed detection circuit and a VCM current Ivcm supplied to a VCM when an actuator is kept at a standstill according to an embodiment of the present invention.

FIG. 5 is a graph schematically showing the relationship between the VCM speed vmeas detected by the VCM speed detection circuit 221 and the VCM current Ivcm supplied to the VCM 15 when the actuator 16 is kept at a standstill. Since the actuator 16 is at a standstill, the detected VCM speed vmeas must be basically equal to 0 irrespective of the value of the VCM current Ivcm. However, the detected VCM speed vmeas changes with a change in the VCM current Ivcm because of the detection error of the VCM speed detection circuit 221. It should be noted that VCM currents Imin, Iid, 10d and Imax will be described later.

More specifically, the detected VCM speed vmeas demonstrates a linear function with an offset v0 at the zero VCM current Ivcm and with a slope α that represents the rate of change of the VCM current Ivcm with respect to the detected VCM speed vmeas. The most contributing factor thereto is that the formula (2) does not hold due to variation of the VCM resistance Rvcm with temperature change. Adding to this is a hardware operational error.

Next, a description will be made of the correction of the detected VCM speed vmeas by the HDC/MPU 23 and the VCM speed feedback control by the same based on the corrected VCM speed. As described above, the HDC/MPU 23 corrects the detected VCM speed vmeas and exercises the VCM speed feedback control based on the corrected VCM speed. More specifically, the HDC/MPU 23 subtracts the offset v0 from the detected VCM speed vmeas and corrects the slope α.

Figure 6:
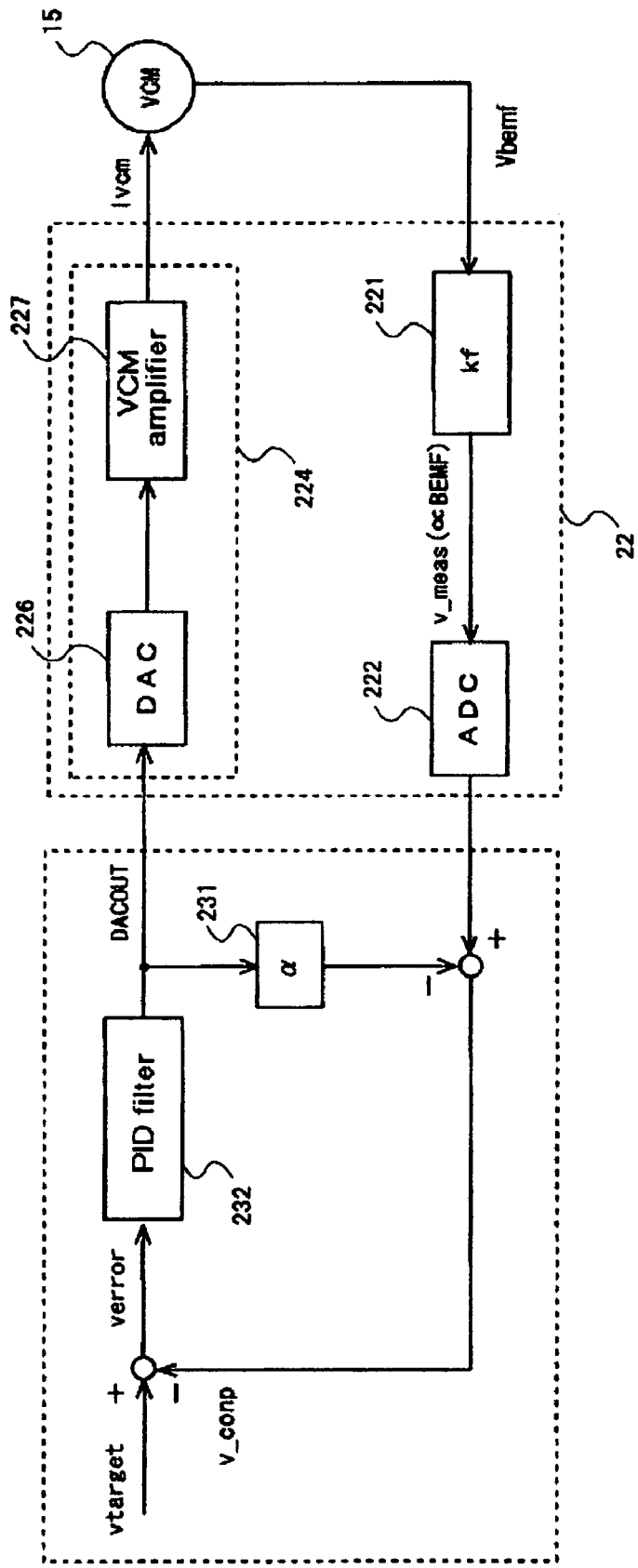
FIG. 6 is a block diagram schematically showing a VCM speed control system according to an embodiment of the present invention.

FIG. 6 is a block diagram schematically showing the VCM speed control system of the present embodiment. The VCM drive unit 224 converts the control data DACOUT from the HDC/MPU 23 to analog data with a DA converter 226. A VCM amplifier 227 supplies the VCM 15 with a current in accordance with the converted analog data. The VCM speed detection circuit 221 detects the counter electromotive voltage Vbemf of the VCM 15 and calculates the VCM speed vmeas by multiplying Vbemf by a gain kf. The VCM speed vmeas detected by the VCM speed detection circuit 221 is converted to digital data by the ADC 222 and transmitted to the HDC/MPU 23.

When supplied with the VCM speed data vmeas, the HDC/MPU 23 further calculates αI, which is the value obtained by multiplying the previous VCM current (DACOUT) by α, using a function 231. To correct the detected VCM speed, the HDC/MPU 23 subtracts the offset v0 from the VCM speed data vmeas (not shown) supplied from the VCM speed detection circuit 221. Further, the HDC/MPU 23 subtracts αI from the resultant value. This makes it possible to identify a more accurate current VCM speed vcomp that has been corrected.

To bring this vcomp closer to a target speed vtarget, a PID filter 232 determines the VCM current as a control amount based on a difference verror between vcomp and vtarget. Then the PID filter 232 outputs DACOUT that represents the difference verror. As described above, the correction conducted by the HDC/MPU 23 ensures accuracy in the VCM speed feedback control during the loading/unloading process.

Next, a description will be made of the calibration by the calibration logic 225 and the determination of the correction factor by the HDC/MPU 23. It should be noted that, in the present document, the determination of the correction factor by the HDC/MPU 23 is referred to as the calibration by the HDC/MPU 23. First, the calibration by the VCM speed detection circuit 221 will be described.

The error between the actual VCM speed and the detected VCM speed vmeas can be reduced by setting the resistance of the variable resistor R2 in the counter electromotive voltage detection circuit 250 so as to compensate for the change of the VCM resistance Rvcm. In one embodiment, the motor driver unit 22 of the present invention is provided with the calibration logic 225. The calibration logic 225 sets the resistance of the variable resistor R2 in response to an instruction from the HDC/MPU 23. The calibration logic 225 corrects the resistance of the variable resistor R2 so as to reduce the slope α.

The calibration logic 225 measures the output of the counter electromotive voltage detection circuit 250 and adjusts the resistance of the variable resistor R2, with the actuator 16 kept at a standstill. It should be noted that the calibration logic 225 is a conventionally known technique and detailed description thereof is omitted in the present document. In order for the HDC/MPU 23 to identify the correction factor, on the other hand, it is necessary to identify the relationship between the detected VCM speed vmeas and the VCM current Ivcm as shown in FIG. 5. In order to accomplish this objective, it is necessary, prior to the loading/unloading process, to supply the actuator 16, which is kept at a standstill, with different currents and detect a counter electromotive voltage for each of the different currents.

The specific process of supplying currents and detecting counter electromotive voltages is different between during loading and unloading. The loading will be described first. Prior to the loading, the HDD 1 positions the actuator 16 so that the actuator 16 is pressed against the outer crash stop 163. The actuator 16 and the VCM 15 are driven by the motor driver unit 22 under the control of the HDC/MPU 23.

First, the calibration logic 225 optimizes the resistance of the variable resistor R2 in response to an instruction from the HDC/MPU 23. As shown in FIG. 4, the calibration logic 225 receives the counter electromotive voltage detected by the counter electromotive voltage detection circuit 250. The calibration logic 225 sets the resistance of the variable resistor R2 based on the received voltage. The calibration logic 225 updates the resistance of the variable resistor R2 so as to reduce $\alpha$.

The correction factor is determined next. The error between the actual VCM speed and the detected VCM speed vmeas can be reduced by correcting the variable resistor R2 using the calibration logic 225. However, this error cannot be completely eliminated. One of the reasons is that the resistance of the variable resistor R2 is set with a discrete value, which makes it impossible to eliminate the error. Therefore, although the slope $\alpha$ decreases in the relationship between the detected VCM speed vmeas and the VCM current Ivcm, the offset and slope may not be completely eliminated as shown in the graph of FIG. 5.

To perform the correction process, the HDC/MPU 23 may obtain the correction factor after the correction of the variable resistor R2, that is, obtain the offset v0 and the slope a that represent the relationship between the detected VCM speed vmeas and the VCM current Ivcm. The HDC/MPU 23 supplies the different VCM currents to the actuator 16, which is pressed against the outer crash stop 163, thus obtaining the offset v0 and the slope $\alpha$ based on the relationship between the detected VCM speed vmeas and the VCM current Ivcm.

More specifically, two different VCM currents Imax and Imin are supplied to the VCM 15 as shown in FIG. 5. The HDC/MPU 23 determines the offset v0 and the slope $\alpha$ from detected VCM speeds vmax and vmin respectively at Imax and mm. It should be noted that more accurate values can be obtained if three or more different currents are supplied. When the HDC/MPU 23 obtains the correction factor, it proceeds with the loading process through speed control based on the obtained correction factor.

The unloading will be described next. One possible way to proceed with the unloading would be to perform the VCM speed control using the same circuit parameter and correction factor as used in the loading. However, the VCM resistance Rvcm during the unloading is usually different from that during the loading due to temperature change. This makes it impossible to provide accuracy in the VCM speed control if the settings for the loading are used.

The calibration logic 225 and the HDC/MPU 23 can proceed with the calibration process as during the loading by pressing the actuator 16 against the inner crash stop 164. Unlike the loading where the actuator 16 is positioned over the ramp 17, however, a sound is produced when the actuator 16 is pressed against the inner crash stop 164. It is, therefore, preferred to perform the calibration without pressing the actuator 16 against the inner crash stop 164.

In one embodiment, the HDC/MPU 23 causes the actuator 16 (the head slider 12) to seek to two different tracks so as to position the actuator 16 over these tracks. As a result, the HDC/MPU 23 obtains the VCM speed vmeas detected when the actuator 16 followed each of the tracks. The HDC/MPU 23 obtains a correction factor for each of the slope $\alpha$ and the offset v0 from the VCM current and the detected VCM speed vmeas at each track. In one aspect, the VCM current Ivcm is substantially constant while the actuator 16 is positioned over each track. On the other hand, the VCM current Ivcm changes when the actuator 16 follows different tracks. This difference is caused by the mechanical characteristic of the actuator 16. The main cause thereof lies in the fact that the resilience of an FPC 18 fastened to the actuator 16 changes.

More specifically, the HDC/MPU 23 calculates a correction factor from two detected VCM speeds vid and vod as shown in FIG. 5. The VCM speed vid is the speed detected at the VCM current Iid when the actuator 16 followed an outer track, whereas the VCM speed vod is the speed detected at the VCM current 10d when the actuator 16 followed an inner track.

As described above, the VCM current varies when different tracks are followed. However, the difference in the VCM current Ivcm is small between tracks. When the actuator 16 is pressed against the outer crash stop 163, the HDC/MPU 23 can set the desired VCM current. However, the VCM current during the following of a track may be determined by the following conditions.

If the difference in the VCM current is small, the detection error of the detected VCM speed vmeas can have a significant impact, and the accuracy of the correction factor is problematic. As a result, the correction factor $\alpha$ used by the HDC/MPU 23 may take on a large value. Similarly, the correction factor $\alpha$ may take on a large value if the calibration by the calibration logic 225 is omitted.

If the correction factor $\alpha$ becomes large to a certain extent, the control system shown in FIG. 6 tends to be unstable because of the reduced phase margin of the VCM speed control system. This makes it impossible for the system to exercise accurate VCM speed control, possibly causing the actuator 16 to crash violently into the outer crash stop 163 or causing the actuator 16 to fail to properly run onto the ramp 17. Further, as the tab 162 runs onto the ramp 17, it may not be able to lift up the head slider 12 from the magnetic disk 11, possibly damaging the head slider 12 and the actuator 16.

Figure 7:
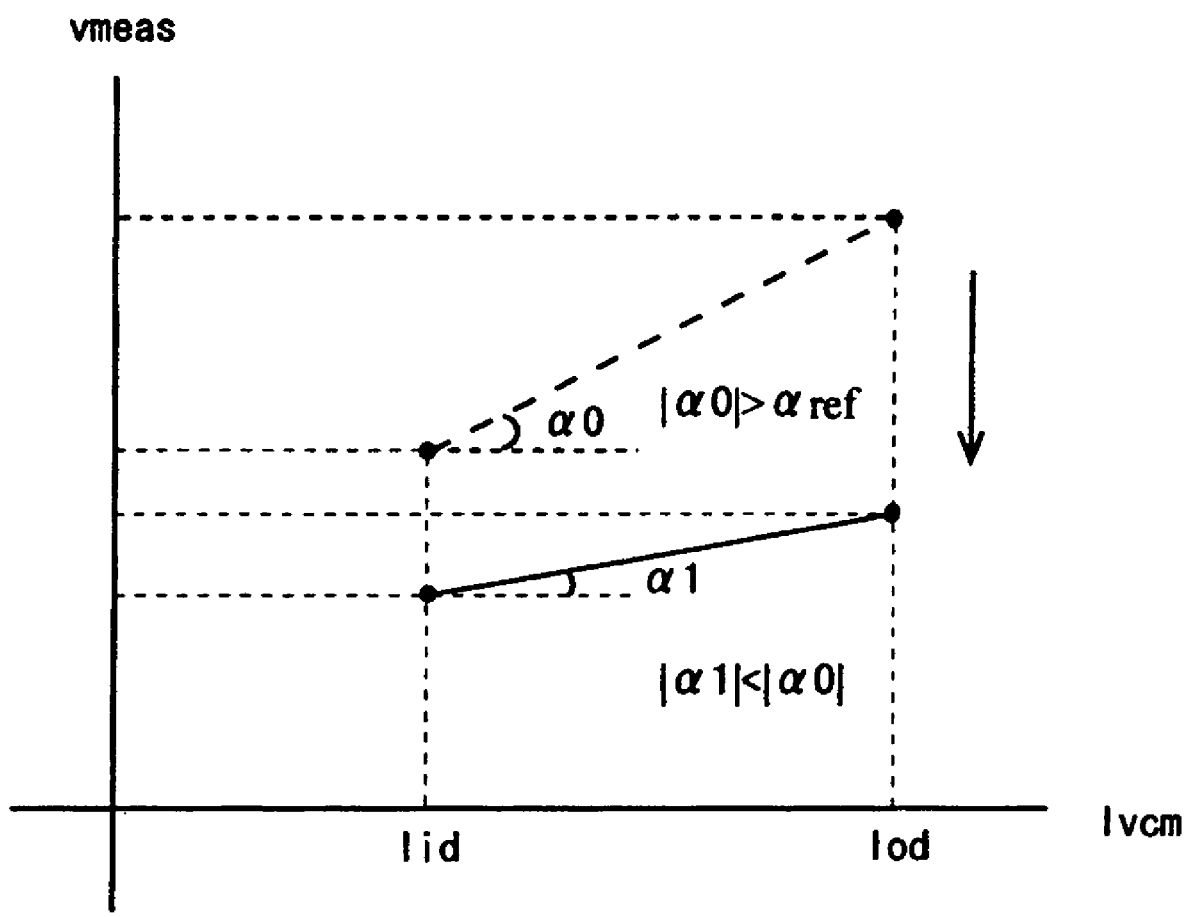
FIG. 7 is a graph schematically showing the relationship between the VCM current and the detected VCM speed and the change of a correction factor during the calibration of a circuit parameter according to an embodiment of the present invention.

In one embodiment, the HDC/MPU 23 calibrates the counter electromotive voltage detection circuit 250 on its own if the calculated correction factor $\alpha$ falls outside the predetermined limit. More specifically, the HDC/MPU 23 determines, by calculation, the resistance of the variable resistor R2 which is the circuit parameter, and sets the calculated resistance into the counter electromotive voltage detection circuit 250. The HDC/MPU 23 controls the actuator 16 again to obtain the detected VCM speeds vmeas for different tracks and recalculate the correction factors for $\alpha$ and v0, thus preventing unstable unloading. More specifically, if a calculated correction factor $\alpha 0$ falls outside the reference limit ($|\alpha 0|>\alpha\text{ref}$) as shown in FIG. 7, the HDC/MPU 23 determines the resistance of the variable resistor R2 so as to reduce the slope. After setting a new resistance into the counter electromotive voltage detection circuit 250, the HDC/MPU 23 calculates a correction factor α1. The absolute value of the slope α1 is smaller than that of the slope α0.

Figure 8:
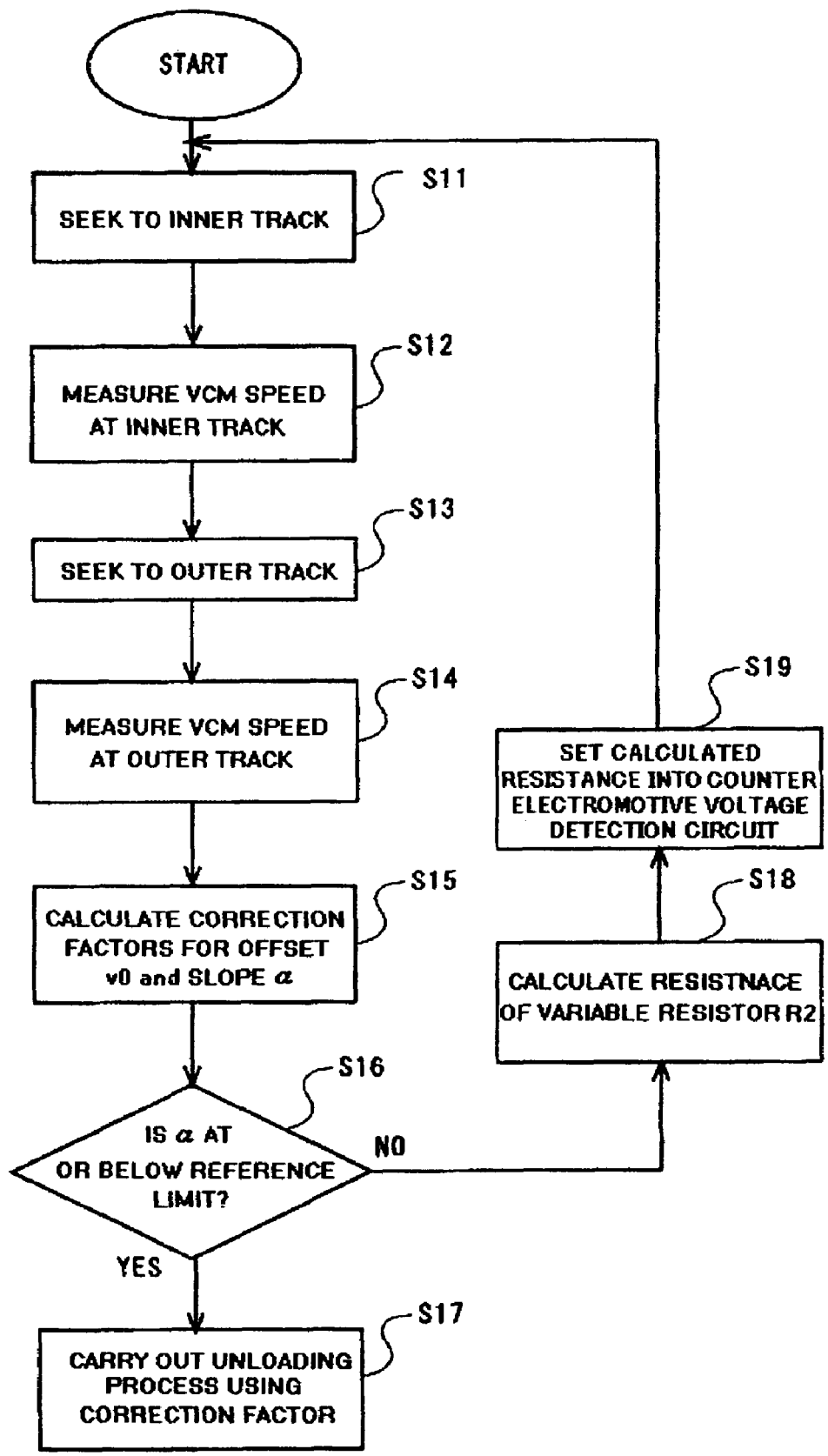
FIG. 8 is a flowchart describing the determination of the correction factor by an HDC/MPU in the unloading process according to an embodiment of the present invention.

The determination of the correction factors by the HDC/MPU 23 will be described with reference to the block diagram in FIG. 4 and the flowchart in FIG. 8. The HDC/MPU 23 outputs the control signal DACOUT to the VCM drive unit 224224, causing the actuator 16 to seek to the predetermined track on the inner side (inner track) and positioning the actuator 16 over that track (S11). While that track is followed, the VCM speed detection circuit 221 measures the VCM speed, which is acquired by the HDC/MPU 23 (S12).

Then the HDC/MPU 23 outputs the control signal DACOUT to the VCM drive unit 224, causing the actuator 16 to seek to the predetermined track on the outer side (outer track) and positioning the actuator 16 over that track (S13). While that track is followed, the VCM speed detection circuit 221 measures the VCM speed, which is acquired by the HDC/MPU 23 (S14).

The HDC/MPU 23 calculates the correction factors for the offset v0 and the slope α, based on the VCM currents at the inner and outer tracks and the VCM speeds detected at these tracks (S15). The HDC/MPU 23 compares the calculated correction factor (e.g., α0 in FIG. 7) and the predetermined reference value (e.g., αref in FIG. 7) to determine whether α falls within the reference limit (S16). Since α takes on a positive or negative value, the reference limit is defined by the absolute value of α. When the absolute value of α is smaller than the reference limit (YES in S16), the HDC/MPU 23 carries out the unloading process using the correction factor (S17).

If the absolute value of α falls outside the reference limit, the HDC/MPU 23 determines a correction factor again. First, the HDC/MPU 23 resets a variable circuit parameter of the counter electromotive voltage detection circuit 250 shown in FIG. 4. More specifically, the HDC/MPU 23 sets the resistance of the variable resistor R2 in the counter electromotive voltage detection circuit 250. The HDC/MPU 23 calculates the resistance of the variable resistor R2 that will reduce the slope α (S118) and sets the resistance into the counter electromotive voltage detection circuit 250 (S19). The calculation method of the resistance of the variable resistor R2 will be described later.

After changing the resistance of the variable resistor R2 in the counter electromotive voltage detection circuit 250 to the new value, the HDC/MPU 23 measures the VCM speed again. That is, the HDC/MPU 23 repeats the above process steps from S11 to S15. It should be noted that if the slope α continues to fall outside the reference limit after the variable resistor R2 is set once or a plurality of times, the process will enter an infinite loop. Therefore, the HDC/MPU 23 no longer resets the resistance after recalculating the correction factor a predetermined reference number of times. Instead, the HDC/MPU 23 carries out the unloading process using the final correction factor.

Next, a description will be made of the calculation method of the resistance of the variable resistor R2 set by the HDC/MPU 23. The speed vmeas detected by the VCM speed detection circuit 221 is represented by formula (4) as follows:

$$vmeas=R4/R3\ (Ivcm \times Rs \times R2/R1-Vvcm)+Vref \quad (4)$$

In order for the VCM speed detection circuit 221 to accurately detect the VCM speed, the gain of the counter electromotive voltage detection circuit 250 must satisfy the relationship in formula (5) as follows:

$$R2/R1=Rvcm/Rs \quad (5)$$

As described above, the HDC/MPU 23 calculates the correction factor by causing the actuator 16 to follow an inner track and an outer track that is positioned more outward on the disk. A VCM speed vmeas_id detected at the inner track is represented by formula (6) as follows:

$$vmeas\_id=R4/R3(Ivcm\_id \times Rs \times R2/R1-Vvcm\_id)+Vref \quad (6)$$

where Ivcm_id and Vvcm_id are the VCM current and the VCM voltage at the inner track, respectively, and Vref is a reference voltage shown in FIG. 6.

Similarly, a VCM speed vmeas_od detected at the outer track is represented by formula (7) as follows:

$$vmeas\_od=R4/R3(Ivcm\_od \times Rs \times R2/R1-Vvcm\_od)+Vrefq \quad (7)$$

where Ivcm_od and Vvcm_od are the VCM current and the VCM voltage at the outer track, respectively.

From the above formulas (6) and (7), the difference between the VCM speeds detected at the inner and outer tracks is represented by formula (8) as follows:

$$vmeas\_id-vmeas\_od=R4/R3(Rs \times R2/R1(Ivcm\_id-Ivcm\_od)-(Vvcm\_id-Vvcm\_od) \quad (8)$$

Further, formula (9) shown below is obtained by modifying the formula (8).

$$(vmeas\_id-vmeas\_od)/(Ivcm\_id-Ivcm\_od)=R4/R3$$

$$(Rs \times R2/R1-(Vvcm\_id-Vvcm\_od)/(Ivcm\_id-Ivcm\_od)) \quad (9)$$

Here, if we assume that the VCM resistance Rvcm has a linear relationship with the voltage Vvcm applied, the VCM resistance Rvcm is equal to the left side of the formula (9). As a consequence, the following formula (10) holds:

$$(Vvcm\_id-Vvcm\_od)/(Ivcm\_id-Ivcm\_od)=Rvcm \quad (10)$$

On the other hand, the slope α that defines the relationship between the VCM current Ivcm and the detected VCM speed vmeas is represented by the following formula:

$$\alpha=(vmeas\_id-vmeas\_od)/(Ivcm\_id-Ivcm\_od) \quad (11)$$

Substituting the formulas (10) and (11) into the formula (9) gives the following formula (12):

$$(R3/R4) \times (1/Rs) \times \alpha=(R2/R1)-(Rvcm/Rs)$$

R2/R1 is the current setting of the counter electromotive voltage detection circuit 250, whereas Rvcm/Rs is the current relationship between Rvcm and Rs. The difference between the two represents the deviation of the gain of the counter electromotive voltage detection circuit 250. That is, this deviation can be found by calculation from the differences in the detected VCM speed and the VCM current between the tracks. The HDC/MPU 23 has already obtained the resistances of the resistors R1, R3, R4 and Rs in advance. The HDC/MPU 23 obtains the current resistance of the variable resistor R2 from the calibration logic 225. Based on these resistances and the relationship in the formula (12), it is possible to calculate the resistance of the variable resistor R2 that will minimize the current VCM resistance Rvcm and the slope α.

While the present invention has been described with reference to a preferred embodiment, it is to be understood that the present invention is not limited to the above embodiment. A person skilled in the art will be able to easily make modifications, additions or changes to each element of the above embodiment without leaving the scope of the present invention. For example, the present invention can be applied to disk drives other than HDD. Further, the present invention can be applied to an HDD having a head slider provided with only a read or write element.

As described above, although it is preferred that the calibration be conducted through track following in the unloading process, the present invention can be applied to the calibration conducted with the actuator pressed against the crash stop. The present invention may also be applied to the loading process. Two tracks followed in each of the correction factor determination steps may be the same or different between different steps. While the present invention is particularly suitable in the present embodiment, it may be applied to a control system in which different circuit parameters and correction factors are set.

What is claimed is:

1. A disk drive comprising:
a head adapted to access a data storage disk;
an actuator adapted to support the head and be driven by a voice coil motor;
a detection circuit adapted to detect a first counter electromotive voltage generated by a first current caused to flow through the voice coil motor, with the actuator positioned in place, the detection circuit further adapted to detect a second counter electromotive voltage generated by a second current, different from the first current, caused to flow through the voice coil motor, with the actuator positioned in place, and the detection circuit further adapted to generate an output based on a circuit parameter; and
a controller adapted to determine a correction factor applied to the output of the detection circuit using the first and second counter electromotive voltages, and to control the drive of the actuator using a value obtained by correcting an output of the detection circuit;
wherein if the correction factor falls outside a reference limit, the controller determines a new circuit parameter for the detection circuit and a new correction factor appropriate to the new circuit parameter.

2. The disk drive of claim 1, wherein
the controller controls the actuator by correcting the output of the detection circuit, into which the new circuit parameter has been set, using the new correction factor, so as to move the head to a parking position.

3. The disk drive of claim 1, wherein
the controller determines the new circuit parameter using the correction factor determined based on the first and second counter electromotive voltages.

4. The disk drive of claim 1, wherein
the detection circuit, into which the new circuit parameter has been set, detects a third counter electromotive voltage generated by a third current caused to flow through the voice coil motor, with the actuator positioned in place, and further detects a fourth counter electromotive voltage generated by a fourth current, different from the third current, caused to flow through the voice coil motor, with the actuator positioned in place; and
wherein the controller determines the new correction factor based on the third and fourth counter electromotive voltages.

5. The disk drive of claim 4, wherein
the detection circuit detects the third counter electromotive voltage when the actuator follows a third track on the disk, and detects the fourth counter electromotive voltage when the actuator follows a fourth track different from the third track.

6. The disk drive of claim 1, wherein
the detection circuit detects the first counter electromotive voltage when the actuator follows a first track on the disk, and detects the second counter electromotive voltage when the actuator follows a second track different from the first track.

7. The disk drive of claim 1, wherein
the controller determines, based on the first and second currents and the first and second counter electromotive voltages, a slope of change of the counter electromotive voltage with respect to the current, and uses the slope as the correction factor.

8. The disk drive of claim 7, wherein
the controller determines the new circuit parameter so as to reduce the slope.

9. The disk drive of claim 1 further comprising a setting circuit adapted to automatically set the circuit parameter,
wherein the detection circuit detects the first and second counter electromotive voltages using the circuit parameter set by the setting circuit; and
wherein the controller sets the new circuit parameter into the detection circuit.

10. A calibration method for controlling the speed of a voice coil motor in a disk drive provided with an actuator adapted to support a head and the voice coil motor adapted to drive the actuator, the calibration method comprising:
supplying the voice coil motor with a first current to position the actuator in place and detecting with a detection circuit having a circuit parameter, a first counter electromotive voltage of the voice coil motor with the actuator positioned in place;
supplying the voice coil motor with a second current different from the first current to position the actuator in place and detecting with the detection circuit having the circuit parameter, a second counter electromotive voltage of the voice coil motor with the actuator positioned in place;
determining, based on the first and second counter electromotive voltages, a correction factor for a counter electromotive voltage detected during the speed control of supplying the voice coil motor with the first and second currents;
if the correction factor falls outside a reference limit, setting a new circuit parameter into the detection circuit; and
determining a new correction factor appropriate to the new circuit parameter.

11. The calibration method of claim 10 further comprising:
detecting the first counter electromotive voltage when the actuator follows a first track on the disk and detecting the second counter electromotive voltage when the actuator follows a second track different from the first track.

12. The calibration method of claim 10, wherein
the controller determines the new circuit parameter using the correction factor determined based on the first and second counter electromotive voltages so as to ensure that the correction factor falls within the reference limit.

13. The calibration method of claim 10 further comprising:
setting the new circuit parameter into the detection circuit;
supplying the voice coil motor with a third current to position the actuator over a third track and detecting a third counter electromotive voltage of the voice coil motor with the actuator positioned over the third track;

supplying the voice coil motor with a fourth current to position the actuator over a fourth track and detecting a fourth counter electromotive voltage of the voice coil motor with the actuator positioned over the fourth track; and determining the new correction factor based on the third and fourth counter electromotive voltages.

* * * * *

UNITED STATES PATENT AND TRADEMARK OFFICE
CERTIFICATE OF CORRECTION

PATENT NO. : 7,561,366 B2
APPLICATION NO. : 11/788481
DATED : July 14, 2009
INVENTOR(S) : Wasa et al.

It is certified that error appears in the above-identified patent and that said Letters Patent is hereby corrected as shown below:

Column 1, Line 46, after "a target speed." please insert:

-- However, as the resistance of a VCM coil changes with change in temperature, the counter electromotive voltage changes, making it impossible for the VCM speed detection circuit to accurately detect the VCM speed. Therefore, Japanese Patent Laid-Open No. 11-25626 (Patent Document 1), for example, discloses a VCM speed control method whereby the controller corrects the detected speed in response to the change in VCM resistance. The controller determines a correction factor based on the VCM speeds that are detected by the VCM speed detection circuit at different currents that are supplied by the controller with the actuator pressed against the crash stop.

The controller can control the VCM speed in response to the change in VCM resistance by correcting the detected VCM speed. However, the controller corrects the detected VCM speed with a correction factor and feeds back the corrected VCM speed. It has been discovered, therefore, that the larger the correction factor used by the controller, the smaller the phase margin of a VCM speed control system, causing the VCM speed control system to become unstable and resulting in an unstable actuator operation.

BRIEF SUMMARY OF THE INVENTION

Embodiments in accordance with the present invention provide disk drives and methods to reduce unstable VCM speed control.

In the particular embodiment of the present invention shown in Figure x, a Hard Disk Controller/Microprocessing Unit (HDC/MPU) 23 supplies, prior to the unloading process, different currents to a VCM 15, with an actuator 16 positioned in place and kept at a standstill. The HDC/MPU 23 determines a correction factor from VCM speeds vmeas, each of which is detected at each of VCM currents Ivcm. If the determined correction factor falls outside a reference limit, the HDC/MPU 23 determines a new circuit parameter PARAMETER for a VCM speed detection circuit 221. Further, the HDC/MPU 23 calculates a new correction factor appropriate to the circuit parameter PARAMETER. The HDC/MPU 23 and the VCM speed detection circuit 221 control the speed of the VCM 15 in the unloading process using the new circuit parameter PARAMETER and the new correction factor.

A disk drive according to an embodiment of the present invention is provided with a head adapted to access a data storage disk, an actuator adapted to support the head and to be driven by a voice coil motor, a detection circuit, and a controller. The detection circuit --

UNITED STATES PATENT AND TRADEMARK OFFICE
CERTIFICATE OF CORRECTION

PATENT NO. : 7,561,366 B2
APPLICATION NO. : 11/788481
DATED : July 14, 2009
INVENTOR(S) : Wasa et al.

It is certified that error appears in the above-identified patent and that said Letters Patent is hereby corrected as shown below:

Column 8, Line 1, please delete "lid, $10d$" and insert -- lid, lod --

Column 9, Line 52, please delete "mm" and insert -- lmin --

Column 10, Line 25, please delete "$10d$" and insert -- lod --

Column 11, Line 40, please delete "S118" and insert -- S18 --

Signed and Sealed this

Twenty-fourth Day of November, 2009

David J. Kappos
*Director of the United States Patent and Trademark Office*